Aug. 18, 1931. K. J. WERSALL 1,819,830
SPRING CONTROLLED CENTRIFUGAL CLUTCH
Filed March 30, 1929
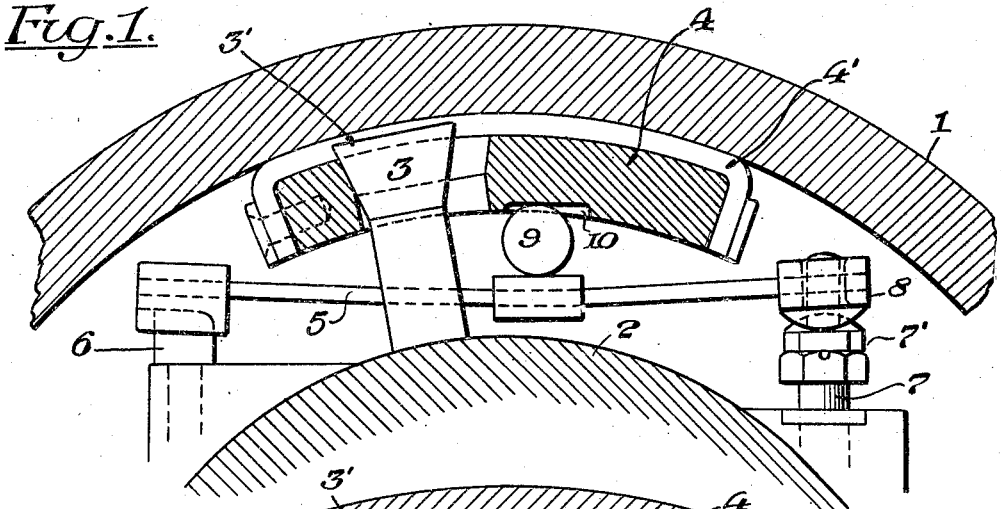
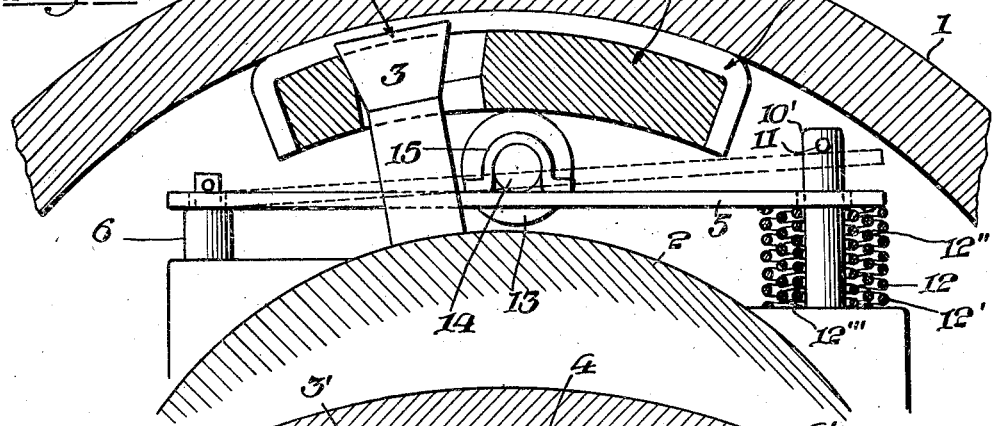
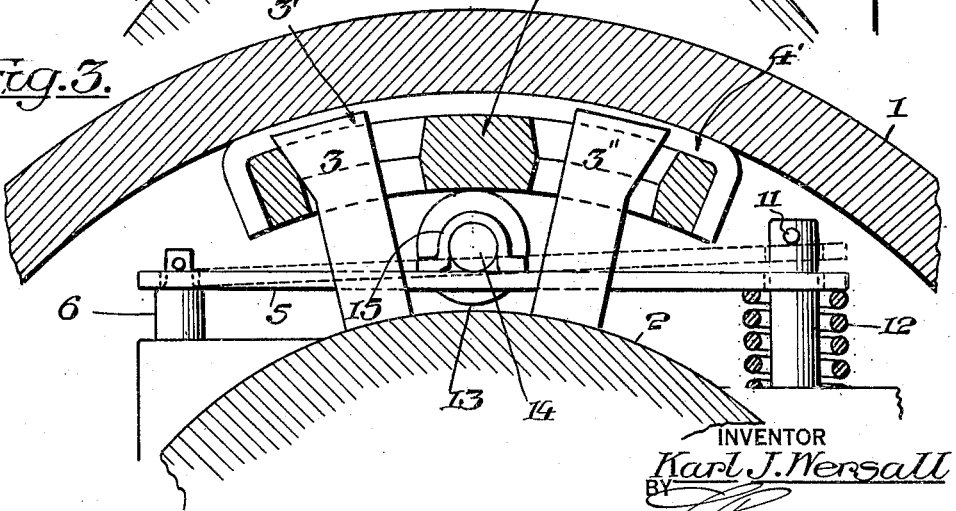
INVENTOR
Karl J. Wersall
BY
ATTORNEY Patented Aug. 18, 1931

1,819,830

UNITED STATES PATENT OFFICE

KARL J. WERSALL, OF NEW YORK, N. Y., ASSIGNOR TO AMERICAN KAMBI COMPANY, OF NEW YORK, N. Y., A CORPORATION OF DELAWARE

SPRING-CONTROLLED CENTRIFUGAL CLUTCH

Application filed March 30, 1929. Serial No. 351,161.

This invention relates to friction or centrifugal clutches, the object of the invention being to provide an improved clutch of this class simple in construction and efficient in use and in which the friction shoe will be free to adjust itself against the track whereby it will stand up against slipping.

It has been found that clutches on the market have the common fault that they do not stand up against slipping in order to take care of the accelerating forces required to start the machine. The present invention, therefore, is for the purpose of doing away with this difficulty. When a clutch shoe or friction body is positively guided and the shoe slips against the track, forces develop—resulting in tearing or injuring the track. In order to have the clutch stand up against such slipping, the shoe must have freedom to adjust itself against the track; and, therefore, when it is necessary to apply a spring pressure on the shoe, this spring pressure must be so applied as not to interfere with the free movement of the shoe.

In the drawings accompanying and forming a part of this specification—

Figure 1 is a sectional view of one form of this improved centrifugal clutch showing the use of a spring-plate and a ball cooperating therewith and the shoe;

Fig. 2 is likewise a sectional view showing the use of spiral springs in connection with the spring-plate; and Fig. 3 is likewise a sectional view showing the clutch constructed for operation in both directions.

Similar characters of reference indicate corresponding parts in the several views.

Before explaining in detail the present improvement and mode of operation thereof, I desire to have it understood that the invention is not limited to the details of construction and arrangement of parts which are illustrated in the accompanying drawings, since the invention is capable of other embodiments, and that the phraseology which I employ is for the purpose of description and not of limitation.

In the form shown in Fig. 1, the friction body or shoe 4 is provided with a friction surface in the form of a brake lining 4' and the shoe is loosely mounted on a driver pin 3 having a conical head 3'. This pin is fastened to a rotary driver 2. The opening in the shoe for the reception of the pin is shown located nearer one end than the other of the shoe and is of such size and construction that the shoe is free to adjust itself against the track or driven means 1. A spring-plate or strap 5 is rigidly supported at one end by mounting it on a rest or post 6, and is adjustably supported at its opposite end by a post 7 carrying a nut 7', the spring-plate being provided with a slotted member 8 into which a portion of the nut 7' projects. The spring-plate is so located as to transmit pressure to the shoe 4 substantially midway of its length and to one side of the pin 3 by means of a ball 9 or similar device located between the spring and the shoe, the shoe being provided with a recess 10 into which a part of the periphery of the ball extends.

In Fig. 2 the friction body 4 is likewise loosely mounted on the driver pin 3 fastened to the driver 2 and is, therefore, free to adjust itself against the track 1. In this form the spring-plate 5 is supported at its free end by a series of spiral springs 12, the pressure of the spring-plate being transmitted to the shoe 4 by a roller 13 mounted on the spring-plate 5 by means of a pin 14 carried by a suitable bearing or clamp 15. This spring-plate 5 is likewise mounted at one end on a rest or post 6, and at its other end is guided in its movements by a post 10' having a cross-pin 11. The spiral spring 12 is made up of alternate right and left-hand springs so as to prevent one projecting or cutting into another. As shown the springs 12' and 12''' are right-handed, while the intermediate spring 12'' is left-handed. In practice one spring may be used, but by using several concentric springs the advantage is gained that for the same resultant pressure longer springs with more flexibility can be used, so that the variation in spring pressure during the wear of the shoe when the springs of necessity must elongate is minimized. By means of the cross-pin 11, when the shoe 4 or the brake lining on the same is worn down, the expansion of the spring is stopped and the spring pressure on the shoe released, thereby weakening the clutch and showing that repair is needed.

In Fig. 3 the construction is similar to that of Fig. 2 except that one spiral spring 12 is used instead of a series of nested spiral springs, and the shoe is carried by a pair of pins 3 and 3″ so constructed and located that the shoe may be driven in opposite directions when desired.

Thus in the present construction the tendency of the shoe to bind or grip the track at one end of the shoe, due to the fact that the shoe is forcibly or positively driven by the pin, is prevented by the action of the spring-plate, the pressure of which is transmitted to the shoe substantially midway of its length through the medium of the circular body upon which the shoe can rock to adjust itself and which thus acts as a pivot, and so offsets this tendency by exerting substantially equal pressure at both ends of the shoe. Furthermore, by the means shown the shoe can readily adjust itself to any inequalities of the friction surface and also to clear itself of any particles or obstructions.

It is to be understood that by describing in detail herein any particular form, structure or arrangement, it is not intended to limit the invention beyond the terms of the several claims or the requirements of the prior art.

Having thus explained the nature of my said invention and described a way of constructing and using the same, although without attempting to set forth all of the forms in which it may be made or all of the modes of its use, I claim:

1. A centrifugal friction clutch comprising a driving member having a radially-extending pin, a driven member, a friction shoe loosely carried by said pin and radially shiftable relatively thereto, and means for insuring freedom of movement of the clutch shoe carried by the pin and comprising a spring and a member intermediate thereof and the shoe for applying the pressure of the spring to the shoe.

2. A centrifugal friction clutch comprising a driving member having a radially-extending pin, a driven member, a friction shoe loosely carried by said pin and radially shiftable relatively thereto, and means for insuring freedom of movement of the clutch shoe carried by the pin and comprising a spring and a member intermediate thereof and the shoe for applying the pressure of the spring to the shoe and located to engage the shoe substantially midway of its length.

3. A centrifugal friction clutch comprising a driving member having a radially-extending pin, a driven member, a friction shoe loosely carried by said pin and radially shiftable relatively thereto, and means for insuring freedom of movement of the clutch shoe carried by the pin and comprising a spring and a member intermediate thereof and the shoe for applying the pressure of the spring to the shoe and located to engage the shoe substantially midway of its length and to one side of the pin.

4. A centrifugal friction clutch comprising a driving member having a radially extending pin, a driven member, a friction shoe loosely carried by said pin and radially shiftable relatively thereto, and means for insuring freedom of movement of the clutch shoe carried by the pin and comprising a spring and a member intermediate thereof and the shoe for applying the pressure of the spring to the shoe and located to engage the shoe to one side of the pin.

5. A centrifugal friction clutch comprising a driving member having a radially extending pin, a driven member, a friction shoe loosely carried by said pin and radially shiftable relatively thereto, and means for insuring freedom of movement of the clutch shoe carried by the pin and comprising a spring and a member intermediate thereof and the shoe for applying the pressure of the spring to the shoe, said intermediate member comprising a curved body.

6. A centrifugal friction clutch comprising a driving member having a radially extending pin, a driven member, a friction shoe loosely carried by said pin and radially shiftable relatively thereto, and means for insuring freedom of movement of the clutch shoe carried by the pin and comprising a spring and a member intermediate thereof and the shoe for applying the pressure of the spring to the shoe, said intermediate member comprising a body having a convex surface.

7. A centrifugal friction clutch comprising a driving member having a radially extending pin, a driven member, a friction shoe loosely carried by said pin and radially shiftable relatively thereto, and means for insuring freedom of movement of the clutch shoe carried by the pin and comprising a spring-plate and a member intermediate thereof and the shoe for applying the pressure of the spring plate to the shoe.

8. A centrifugal friction clutch comprising a driving member having a radially extending pin, a driven member, a friction shoe loosely carried by said pin and radially shiftable relatively thereto, means for insuring freedom of movement of the clutch shoe carried by the pin and comprising a spring, a member intermediate thereof and the shoe for applying the pressure of the spring to the shoe, and means for controlling an end of said spring.

9. A centrifugal friction clutch comprising a driving member having a radially extending pin, a driven member, a friction shoe loosely carried by said pin and radially shiftable relatively thereto, means for insuring freedom of movement of the clutch shoe carried by the pin and comprising a spring, a member intermediate thereof and the shoe for applying the pressure of the spring to the shoe, and spring means co-operating with one end of the spring.

10. A centrifugal friction clutch comprising a driving member having a radially extending pin, a driven member, a friction shoe loosely carried by said pin and radially shiftable relatively thereto, means for insuring freedom of movement of the clutch shoe carried by the pin and comprising a spring, a member intermediate thereof and the shoe for applying the pressure of the spring to the shoe, and coiled spring means co-operating with one end of the spring.

11. A centrifugal friction clutch comprising a driving member having a pair of radially-extending pins, a driven member, a friction shoe loosely mounted upon said pins for radial shiftable movement, a spring, and means therebetween and the shoe for applying the pressure of the spring to the shoe.

12. A centrifugal friction clutch comprising a driving member having a pair of radially-extending pins, a driven member, a friction shoe loosely mounted upon said pins for radial shiftable movement, a spring, means therebetween and the shoe for applying the pressure of the spring to the shoe, and a spiral spring for supporting one end of said spring.

13. A centrifugal friction clutch comprising a driving member, a driven member, a friction shoe connected with the driving member and positively driven thereby, and means for exerting a substantially equal pressure on both ends of the positively driven shoe and comprising spring acting means, and an intermediate body so located as to permit the shoe to rock thereon to adjust itself.

Signed at New York, county of New York, and State of New York, this 2nd day of March, 1929.

KARL J. WERSALL.